United States Patent [19]

Jeanson

[11] 3,969,178
[45] July 13, 1976

[54] APPARATUS FOR MAKING A SHEET MOLDING COMPOUND

[75] Inventor: Richard L. Jeanson, Watertown, Wis.

[73] Assignee: Menasha Corporation, Neenah, Wis.

[22] Filed: Jan. 20, 1975

[21] Appl. No.: 542,690

Related U.S. Application Data

[62] Division of Ser. No. 329,524, Feb. 5, 1973.

[52] U.S. Cl. .............................. 156/361; 156/202; 156/459; 156/486; 156/543; 242/67.1 R
[51] Int. Cl.² .......................................... B65H 27/04
[58] Field of Search .......... 156/378, 361, 202, 276, 156/459, 486, 543; 242/67.1 R; 118/203, 261, DIG. 4

[56] References Cited
UNITED STATES PATENTS

| | | | |
|---|---|---|---|
| 1,944,835 | 1/1954 | Boyers | 427/356 |
| 2,876,039 | 3/1959 | Vogdt | 239/215 |
| 3,012,603 | 12/1961 | Newsome et al. | 156/199 |
| 3,294,060 | 12/1966 | McIntyre et al. | 118/261 |
| 3,654,894 | 4/1972 | Rohrbacker et al. | 118/261 |
| 3,659,553 | 5/1972 | Tobias | 118/261 |
| 3,734,814 | 5/1973 | Davis et al. | 156/276 |
| 3,861,982 | 1/1975 | Wilson et al. | 156/276 |

Primary Examiner—Edward G. Whitby
Attorney, Agent, or Firm—Andrus, Sceales, Starke & Sawall

[57] ABSTRACT

An apparatus for making a sheet molding compound. A thickened uncured thermosetting resin mix is supplied as a thin coating to a sheet of plastic film and chopped fibers are deposited on the resin film to provide a composite laminate. The side edges of the plastic film are then folded inwardly in a double fold and the laminate is wound in coiled form. Kneading rolls having ribbed surfaces ride against the coiled laminate to provide a thorough impregnation of the resin and fibers.

23 Claims, 17 Drawing Figures

19
APPARATUS FOR MAKING A SHEET MOLDING COMPOUND

This is a division of application Ser. No. 329,524, filed Feb. 5, 1973.

BACKGROUND OF THE INVENTION

In the manufacture of fiber reinforced resin products, sheet molding compounds are frequently used which consist of a mixture of a viscous uncured thermosetting resin and chopped fibers, such as glass fibers. In most cases the resin and chopped fibers are sandwiched between films of plastic material to form a laminated structure which is wound in coiled form. The laminate is stored under conditions which will not result in final curing of the resin. At the time of use, the laminate is uncoiled and cut to the desired size and shape for the molding position.

As the resin which is employed to provide the sheet molding compound is relatively viscous, specific procedures must be employed to provide a thorough impregnation of the resin and fibers. In the past, impregnation has been achieved by passing the laminated structure between cooperating rolls or flexing the laminate in concave and convex shapes. Even with these procedures it has been difficult to provide complete impregnation of the fibers at the edges of the laminate without squeezing the resin from the laminate. Conseqently, the fibers at the side edges of the laminate often lack proper impregnation and because of the incomplete impregnation, it is common practice to discard portions of the side edges of the laminate.

SUMMARY OF THE INVENTION

The invention relates to an apparatus for combining a partially cured thermosetting resin and chopped reinforcing fibers into a sheet molding compound.

According to the invention, plastic film, such as polyethylene film, is uncoiled from a drum and passed through a resin applying unit which serves to apply a thin film or coating of resin to the upper surface of the plastic film. The plastic film is then advanced to a fiber chopping unit where chopped fibers are deposited on the resin layer to provide a laminated structure. After application of the chopped fibers, the side edges of the film are then folded inwardly in a double fold and the laminate is then wound in coiled form. Kneading rolls having ribbed surfaces ride against the coiled laminate to knead the resin and fibers and provide thorough impregnation of the materials.

The invention also includes a sheet tensioning device which senses the tension on the polyethylene film and is operably connected to a brake mechanism associated with the drum containing the coiled film. If the film slackens, the sensing unit will actuate the brake to apply a braking force to the drum to thereby increase the tension on the film or sheet. Conversely, if the tension on the film increases, the brake pressure is released.

The film is advanced through the apparatus by means of a driven, take-up roller and a mechanism is included for maintaining a constant film speed as the diameter of the laminate on the take-up roll is increased.

The sheet molding compound produced by the invention includes only a single plastic sheet or film. This not only is a substantial cost savings over conventional systems using two plastic films, but also provides a considerable labor saving at the time of use in that only a single sheet of the film is required to be removed from the laminate.

The double folded edge on the plastic film in the sheet molding compound provides a dual function. The first fold serves to confine the resin and fibers and provides a dam so that as the material is kneaded by the kneading rollers, the resin and fibers will not be squeezed or extruded from the side edges of the laminate. The second or reverse fold provides a projecting tap which can be easily grasped by the operator to remove the plastic film from the sheet molding compound at the time of use.

As the apparatus includes an automatic film tensioning device as well as an automatic speed control for the film, a more uniform product is obtained.

Other objects and advantages will appear in the course of the following description.

DESCRIPTION OF THE PREFERRED EMBODIMENT

Figure 1:
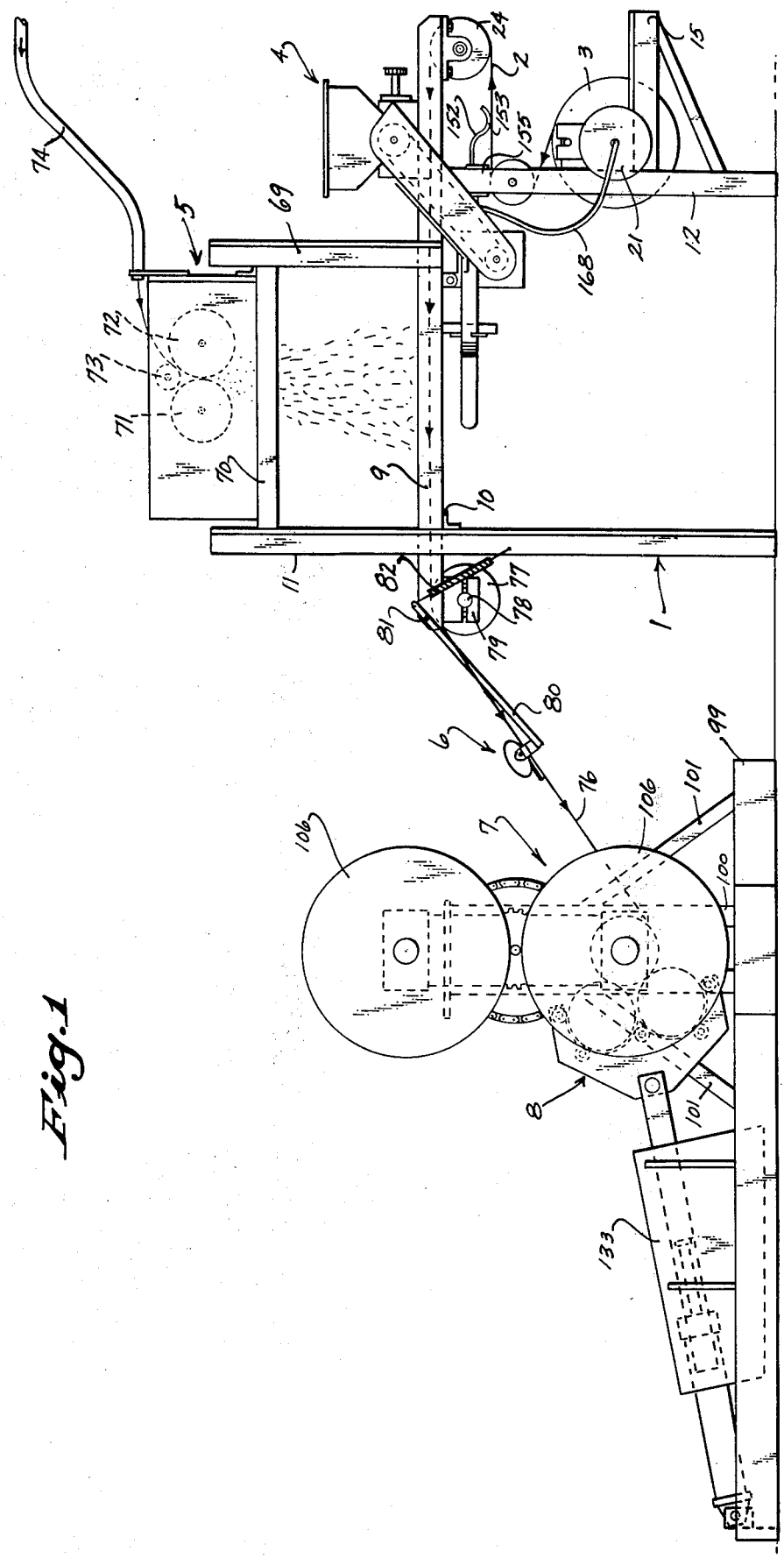
FIG. 1 is a side elevation of the apparatus of the invention.

FIG. 1 illustrates the apparatus for combining a partially cured thermosetting resin and chopped fibers into a sheet molding compound. The apparatus, in general, includes a supporting structure or frame 1 and a plastic film 2, such as polyethylene film, is contained in coiled form on a drum 3 that is mounted for rotation on the frame. The film 2 is unwound from the drum 3 and advances successively through a resin supply unit 4, where a thin coating or layer of resin is applied to the upper surface of the film and then through a fiber chopping unit 5, where chopped fibers are applied to the resin layer. The resulting laminated structure then passes through a pair of edge folding units 6 which serve to fold the exposed side edges of the film 2 into a double or reverse fold. Following this, the laminate is wound in coiled form on a take-up roll assembly 7, and a kneading roll unit 8 acts against the surface of the coiled laminate to provide a kneading action and thoroughly impregnate the resin and glass fibers.

The frame 1 which supports the resin supply unit 4 and the chopping unit 5 comprises a pair of horizontal side angles 9 which are connected together by cross angles 10. A pair of rear legs 11 are secured to the sides of the side angles 9 and project upwardly beyond the side angles, while a pair of front legs 12 are secured to the undersurface of the side angles 9.

Figures 2, 3:
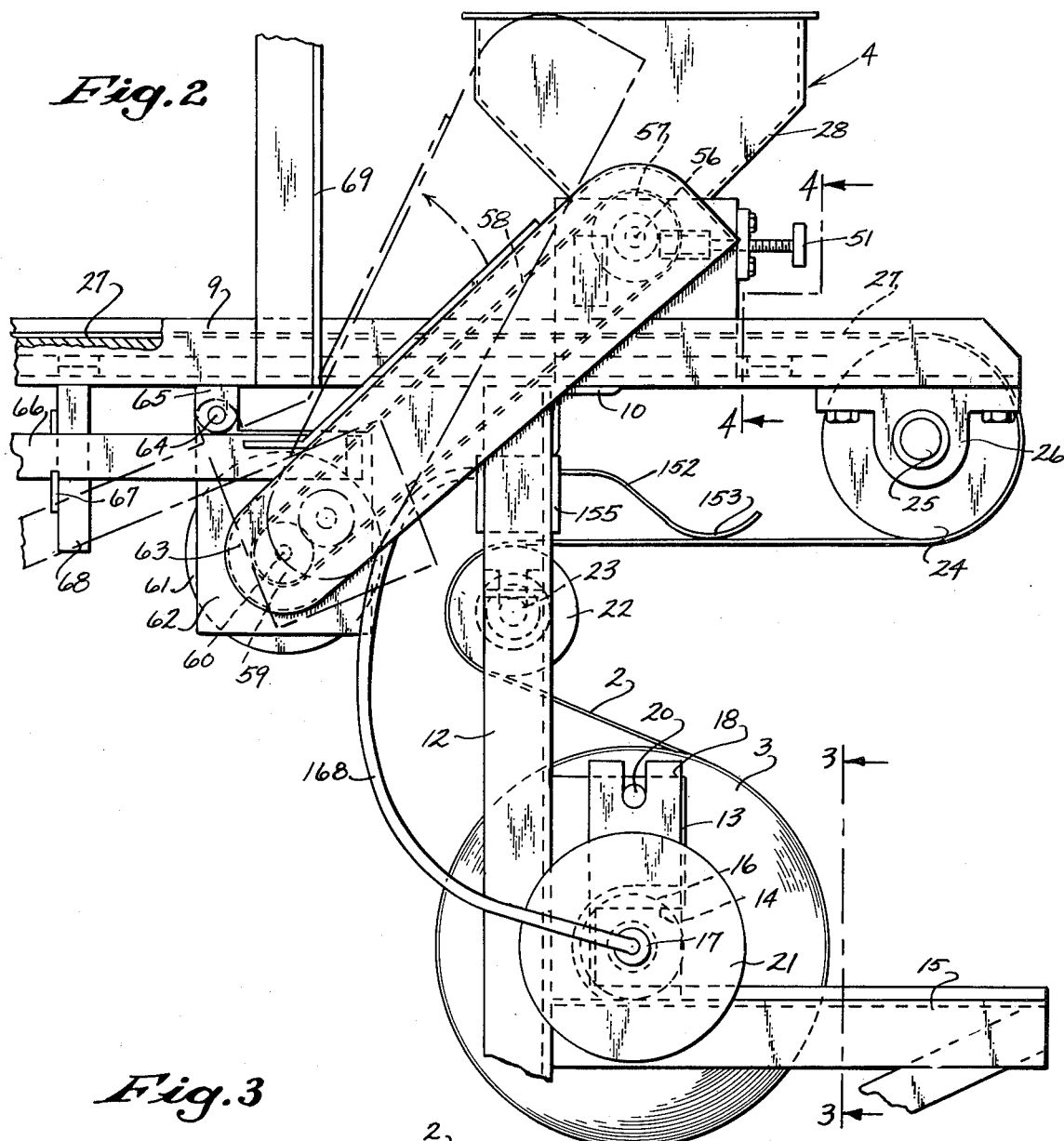
FIG. 2 is an enlarged fragmentary side elevation showing the coiled plastic film, the resin supply unit and the film tensioning mechanism.
FIG. 3 is a section taken along line 3—3 of FIG. 2.

The drum 3 on which the film 2 is wound is supported by the front legs 12 of frame 1. As best shown in FIGS. 2 and 3, a bracket 13 is attached to each of the legs 12, and is provided with a forwardly facing slot 14. A guide bar 15 is also secured to each leg 12 beneath the bracket 13. The upper surface of the guide bar 15 and the downwardly facing surface of the bracket 13 bordering the slot 14 are grooved and are adapted to receive bearing cartridges 16 secured to the shaft 17 of the drum 3. This construction facilitates the installation and removal of the drum 3. To install the drum 3, the bearing cartridges 16 are merely positioned on the projecting ends of the guides 15 and the entire drum is rolled rearwardly on the guides until the bearing cartridges are positioned within the slots 14.

To prevent rotation of the drum 3 as the coiled film 2 is unwound, a reaction bracket 18 is secured to the quill shaft 17 of the drum and is provided with a slot which receives a pin 20 attached to the fixed bracket 13.

A brake mechanism 21 is attached to the outer end of the quill shaft 17 and operation of the brake mechanism will be described hereinafter.

The film 2 withdrawn from the drum 3 passes around a roll 22, and the roll shaft 23 is journalled within bearings attached to the legs 12. The film 2 is then passed horizontally and around a roll 24 having a shaft 25 journalled within bearing blocks 26 supported from the side angles 9.

After travelling around the roll 24, the film passes across the table 27 which is carried by the cross angles 10 of the frame. As the film moves across the table, it passes successively beneath the resin supply unit 4 and the fiber chopping unit 5.

Figure 4:
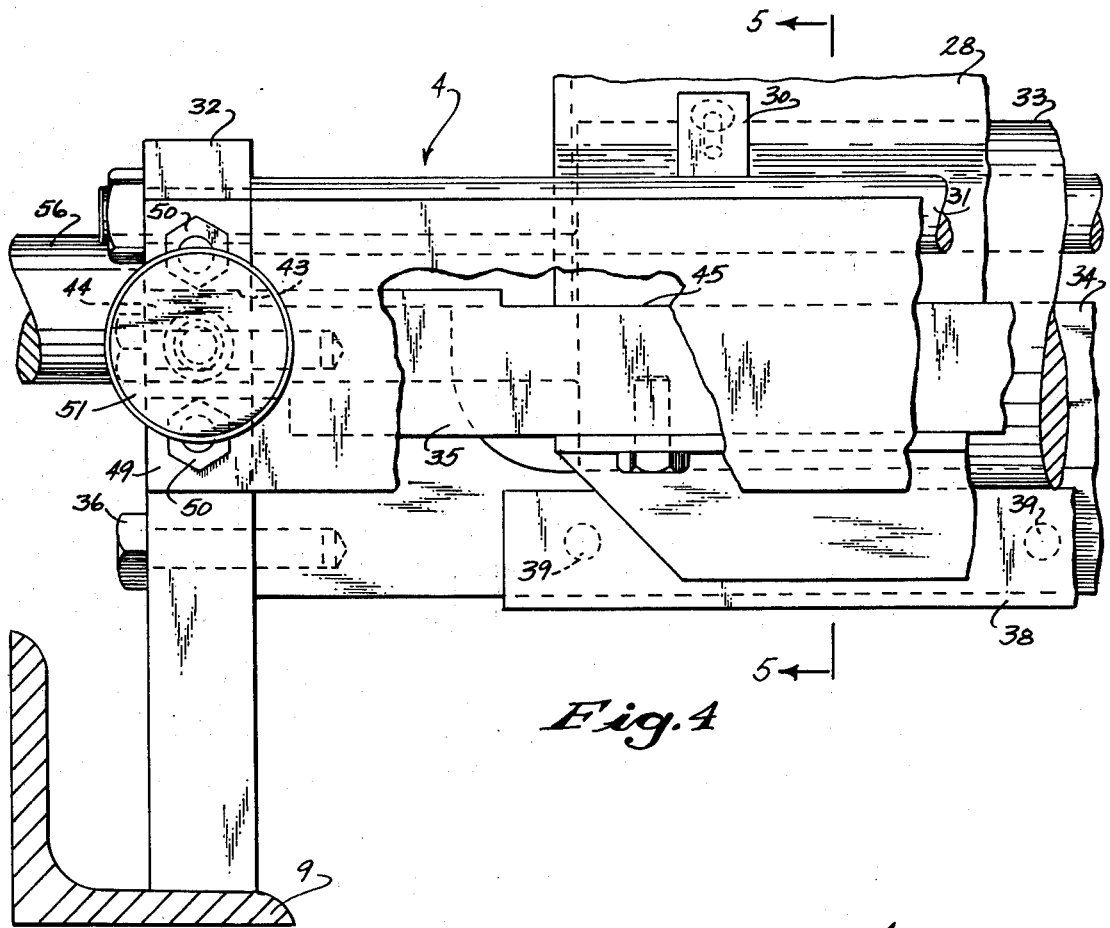
FIG. 4 is a section taken along line 4—4 of FIG. 2 with parts broken away and showing the resin supply unit.
Figure 5:
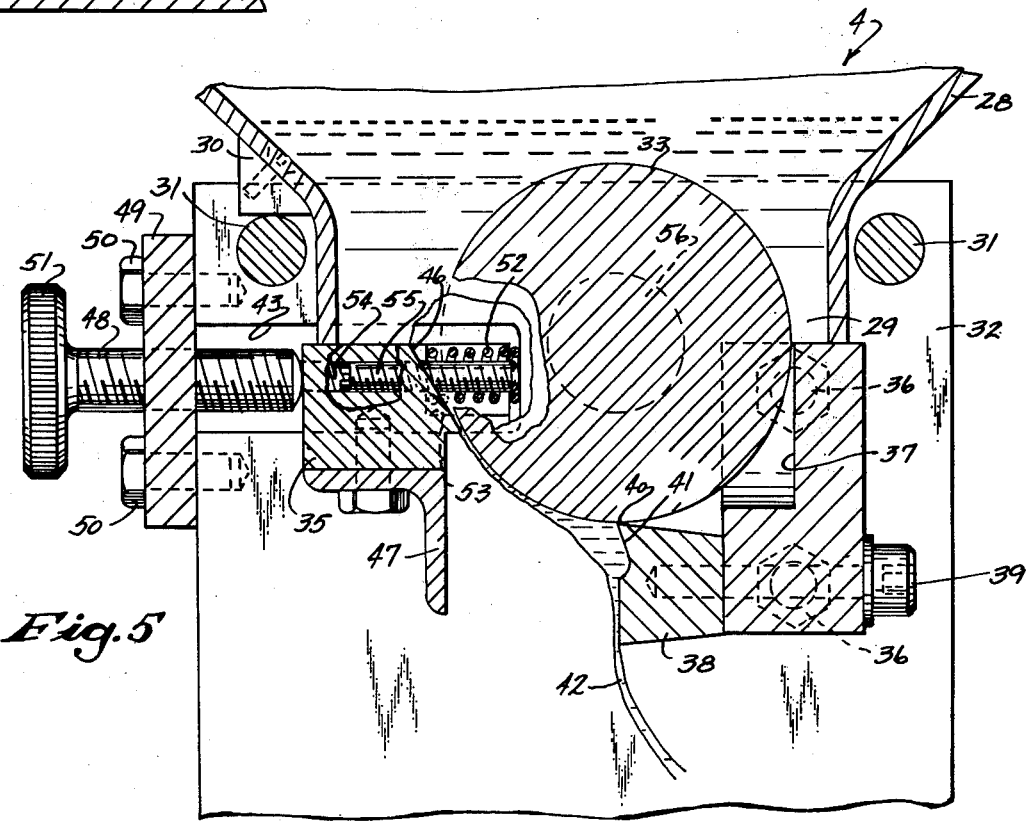
FIG. 5 is a section taken along line 5—5 of FIG. 4.

The resin supply unit 4, as best illustrated in FIGS. 4 and 5, includes an open top trough 28 which is adapted to contain a supply of the uncured, relatively viscous, liquid resin mix. The resin mix at this point is at or near its original mix viscosity. As illustrated in FIG. 5, the lower end of the trough 28 defines a throat 29. A pair of generally triangular blocks 30 are secured to the converging side walls of the trough adjacent the throat 29 are are adapted to rest on horizontal rods 31 which are connected between end plates 32. As shown in FIG. 4, the end plates rest on the side angles 9 at the sides of the frame 1.

A smooth surface, generally cylindrical roll 33 is mounted for rotation within the throat 29 and a fixed block 34 and an adjustable slide block 35 are connected to the end plates 32 and are disposed in close proximity to the outer peripheral surface of the roll 33. As shown in FIG. 5, the ends of the fixed block 34 are secured to the respective end plates 32 by bolts 36 and the central portion of the fixed block 34 is recessed at 37 to receive the rotating roll 33. Secured to the lower end of the fixed block 34 is a wiper or doctor member 38 formed of plastic material, such as nylon or the like. Wiper member 38 is secured to the fixed block 34 by a series of bolts 39 and the upper longitudinal edge 40 of the wiper member rides against the surface of the roll 33 to scrape or doctor the resin from the roll. Beneath the edge 40 is a longitudinally extending groove or recess 41, and the resin which is scraped from the roll passes through the recess and trails off from the wiper member in the form of a thin layer or coating 42 which is deposited on the upper surface of the film 2 which is moving along the table 27.

The slide block 35 is mounted for adjustable movement toward and away from the roll 33. To provide this adjustable mounting, each end plate 32 is provided with a horizontal slot 43 (see FIG. 5), and the ends 44 of the slide block 35 are received within the respective slots 43. The slide block 35 is provided with a recessed central portion 45 which receives the roll 33, and the center portion 45 is provided with an inclined surface 46 which is located in close proximity to the peripheral surface of the roll 33, and functions to meter a thin film or coating of resin onto the outer surface of the roll. The central portion 45 of the slide block 35 is reinforced by an angle 47 which is bolted to the undersurface of the slide block.

The slide block 35 is adapted to be moved toward the roll 33 by a pair of adjusting screws 48 which are threaded within openings in a plate 49 that is attached to the end plates 32 by bolts 50. The outer end of each adjusting screw 48 is provided with a hand knob 51, and by turning down the screws 48 the slide block 35 can be moved inwardly toward the roll 33, which, in effect, will regulate or vary the thickness of the coating of resin applied to the peripheral surface of the rotating roll 33. The quantity of resin applied at film 2 is preferably varied by changing the rotational speed of roll 33, but it also can be varied by adjustment of block 35.

The slide block 35 is biased outwardly away from the surface of the roll by a pair of springs 52 which are located within recesses 53 formed in the ends 44 of the slide block 35. The end of each spring bears against the bottom of the slot 43 in the end plate 32, while the opposite end of each spring bears against the slide block 35 to urge the slide block outwardly within the slots 43.

To prevent the slide block 35 from being moved inwardly into engagement with the roll 33, each end 44 of the slide block is provided with a threaded bore 54 which communicates with the respective recess 53. A set screw 55 is threaded within each bore 54 and the end of the set screw projects beyond the end of the slide block and engages the bottom of the respective slot 43. Set screws 55 are positioned so that they will bottom out against the bottom of the slot 43 before the inclined surface 46 of the slide block 35 will engage the peripheral surface of roll 33 to thereby space the inclined surface 46 from the roll.

To rotate the roll 33, the shaft 56 of the roll carries a sprocket 57 which is connected by chain 58 to a sprocket 59 on the drive shaft 60 of a variable speed motor 61, as shown in FIG. 2. Motor 61 is carried by a mounting plate 62 and a chain guard 63 is attached to the plate and surrounds the chain 58 as well as the sprockets 57 and 59. The plate 62 is connected at pivot 64 to lugs 65 which extend downwardly from the side angles 9 of the frame so that the plate 62, as well as the motor 61 and chain guard 63, can be pivoted with respect to the frame.

To pivot the motor and mounting plate 62, a lever arm 66 is connected to the plate 62, and in the normal operating position the lever arm is horizontal and is secured in this position by engagement with a latch 67 carried by the support 68 that extends downwardly from the side member 9. By releasing the lever arm 66 from the latch 67, the lever arm can be pivoted downwardly, thereby rotating the mounting plate 62 and motor 61 around the pivot 64. This action will slacken the chain 58 to enable the chain to be readily disengaged from the sprocket 57. By varying the speed of motor 61, the thickness of the resin coating applied to the plastic film 2 can be changed as desired.

The fiber chopping unit 5 is a conventional structure. As best shown in FIG. 1, a pair of legs or supports 69 extend upwardly from the side angles 9 and the legs 69 are connected to the upper ends of the legs 11 by means of horizontal angles or supports 70. The fiber chopping unit, indicated generally by 5, is supported on the angles 70 and in general consists of a chopper roll 71 having helical blades which ride against a rubber surface roll 72. In addition, an anvil roll 73 is mounted to ride against the rubber surface roll. The glass strands or yarns are fed to the fiber chopping unit 5 through a series of tubes 74 and as the yarns pass between the rolls 71 and 72, they are cut or severed into short lengths which fall downwardly onto the resin layer 42 on film 2 to provide an upper layer of short chopped fibers 75. Thus, the composite structure leaving the fiber chopping unit 5 is a laminate 76 consisting of the polyethylene film 2, the coating of resin 42 and the layer of chopped fibers 75.

The laminate 76 passes over an expander roll 77 having a shaft 78 which is held within clamping blocks 79 supported from the side angles 9. The expander roll 77 is supplied with internal bearing and is a conventional type having expanding longitudinally extending sections which act to keep the laminate taut in a lateral direction.

Figure 6:
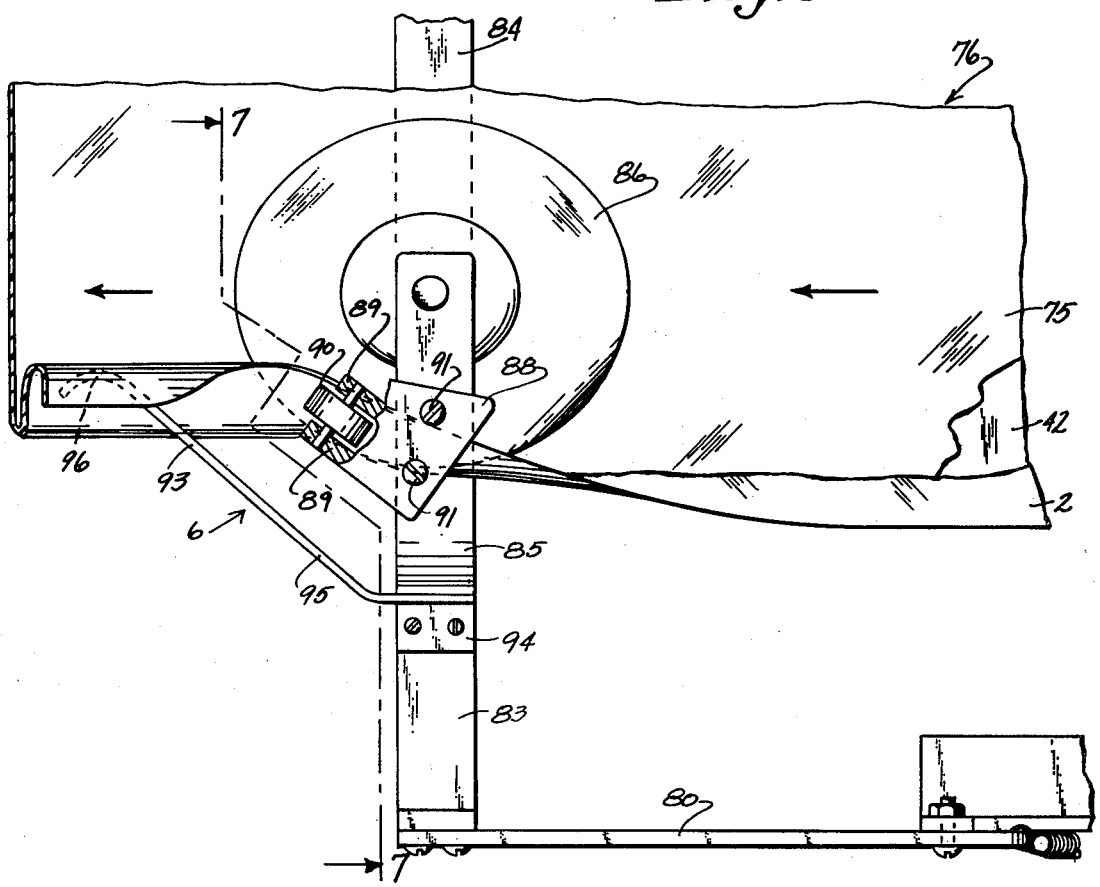
FIG. 6 is an enlarged plan view of the edge folding mechanism.

As best shown in FIG. 6, the film 2 has a greater width than the resin coating 42 and the layer of chopped fibers 75 so that the side edges of the film 2 project laterally beyond the coating 42 and layer 75.

Figure 7:
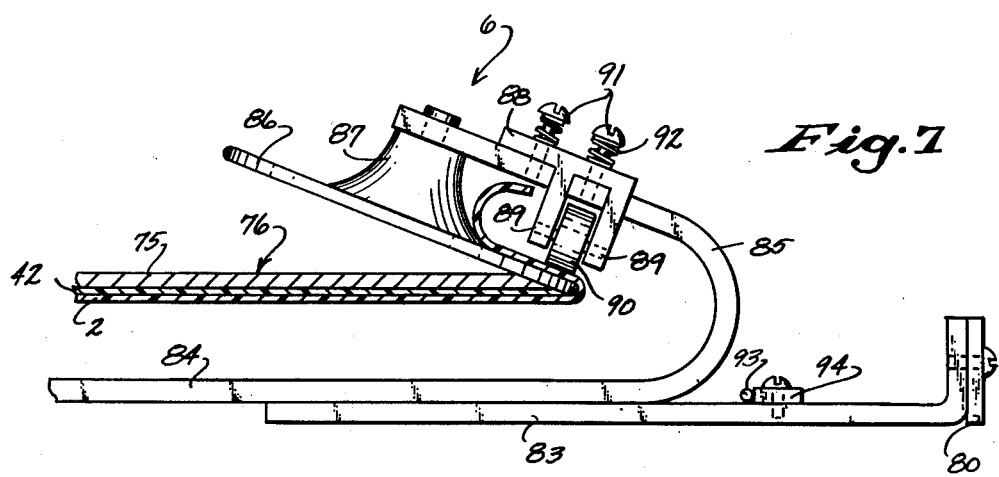
FIG. 7 is a section taken along line 7—7 of FIG. 6.

The edge folding mechanism 6 then acts to fold the projecting side edges of the film 2 into a double fold. As best illustrated in FIGS. 6 and 7, the edge folding mechanism consists of a pair of arms 80 extending downwardly at an angle from the frame 1, and the arms are pivotally connected to the side angles 9 at pivots 81. The arms 80 are urged upwardly by extension springs 82 (see FIG. 1). One end of each spring is connected to the upper end of the arm 80, while the lower end of each spring is engaged within an opening in the leg 11. The force of the springs 82 acts to bias the arms 80 upwardly toward the laminate 76.

The lower end of each arm 80 is connected to a cross arm 83 and a connecting bar 84 having U-shaped ends 85 is secured to the inner ends of the arms 83. The ends 85 of the bar 84 extend at an angle of approximately 60° with respect to the body of the bar.

As best shown in FIG. 7, a generally flat disk 86 is mounted for rotation on each end 85 of bar 84. Each disk 86 is provided with a hub 87 that is mounted for rotation on the undersurface of the respective end 85. The projecting side edges of the film 2 of laminate 76 are adapted to be folded over the peripheral edges of the respective disks 86, and to provide this action, a plate 88 is mounted on the upper surface of each end 85 and is provided with a pair of spaced depending legs 89. A roller 90 is journalled for rotation between the legs 89 and cooperates with the upper surface of the disk 86, as shown in FIG. 7, to fold the side edge of the film 2 over the disk. Plate 88 is spring mounted with respect to the end 85 by means of screws 91 which extend freely through openings in the plate and are threaded within the end 85. Springs 92 are located between the plate 88 and the heads of the screws and urge the plate 88 toward the end 85.

To provide the second or reverse fold for each side edge of the film 2, a wire 93 is secured to a block 94 that is connected to each arm 83. As shown in FIG. 6, the wire is provided with a generally straight shank 95 which extends outwardly at an angle to the bar 84 and terminates in a curved end 96. The free side edge of the film is adapted to be folded over the end 96 to provide a double or reverse fold for the film.

Figure 8:
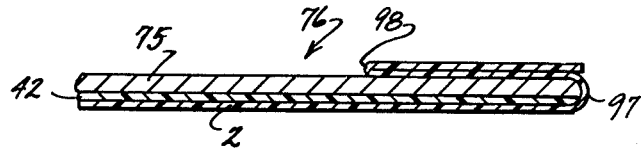
FIG. 8 is a transverse section of the laminated structure showing the double folded edge of the plastic film.

As the laminate 76 approaches the edge folding mechanism 6, the edge of the film is initially folded over the disk 86 to provide a first fold 97, and the free edge of the film is then folded backward in a reverse fold 98 by action of the curved end 96 of the wire 93. Thus, the side edge portions of the laminate 76 have a cross-sectional configuration as shown in FIG. 8 as it leaves the edge folding mechanism 6.

Figure 9:
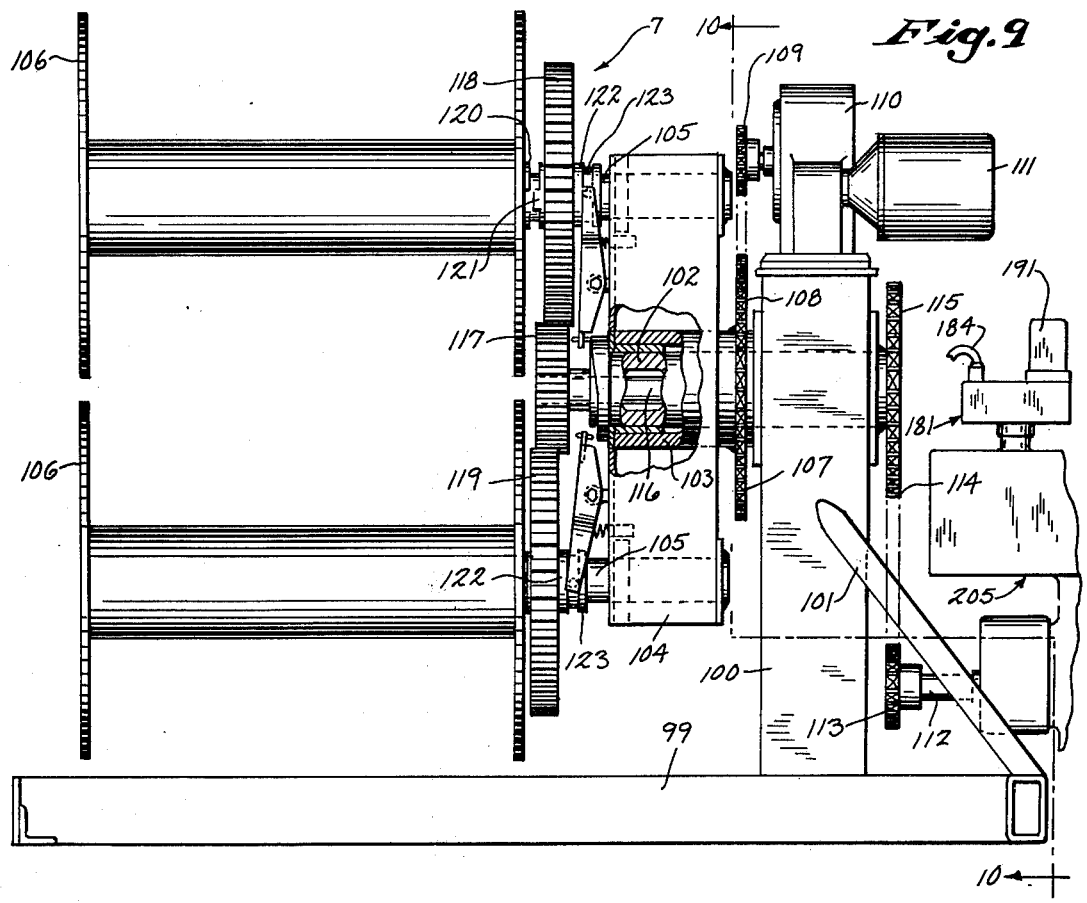
FIG. 9 is an end view, with parts broken away, of the take-up unit.
Figure 10:
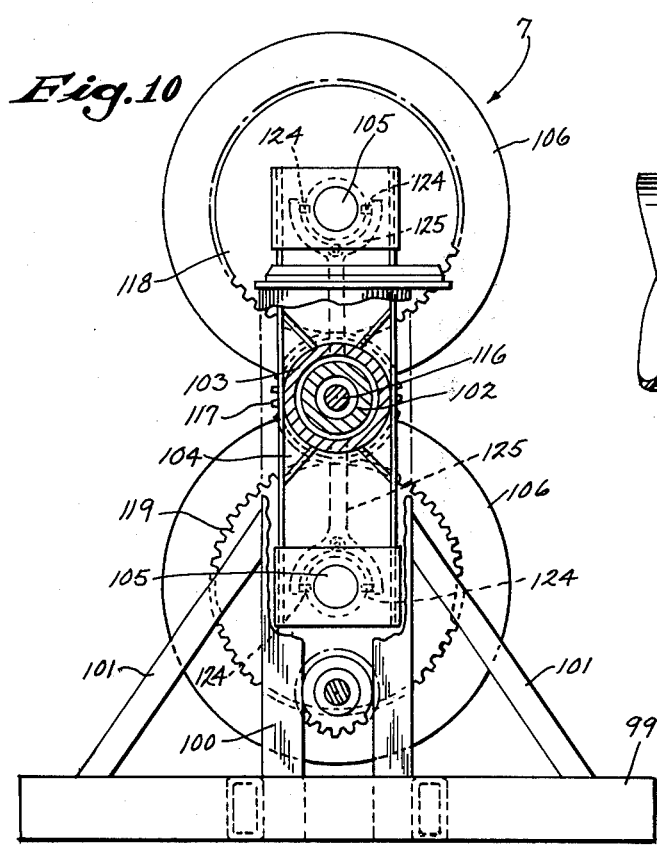
FIG. 10 is a section taken along line 10—10 of FIG. 9.
Figure 11:
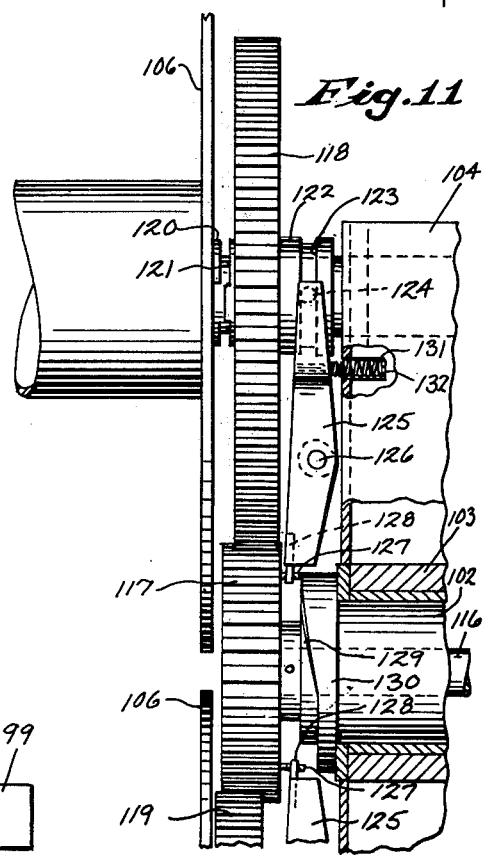
FIG. 11 is an enlarged elevation showing the clutch mechanism for the take-up rolls.

The take-up assembly, as shown in FIGS. 9–11, includes a fixed base 99, and a vertical column 100 is mounted on the base and is reinforced by a pair of diagonal braces 101. A horizontal sleeve 102 is secured within an opening in the upper end of the column 100 and one end of the sleeve 102 projects laterally from the column, and a hub 103 of a support member 104 is journalled for rotation on the projecting end of sleeve 102. Each end of the support member 104 carries a shaft 105 that is cantilevered from the support 104, and a take-up spool or reel 106 is removably mounted on each of the shafts 105. The support 104 is normally in a vertical position when the apparatus is operative and the laminate 76 is wound on the lower of the vertically disposed spools or reels 106. When the lower reel 106 has been fully wound, the lower reel is removed from the shaft 105 and the support 104 is rotated 180° to position the upper reel in the lower position where the laminate 76 can then be wound on that reel.

To rotate the support member 104, a sprocket 107 is secured to the hub 103 and is connected by a chain 108 to a sprocket 109 which is mounted on the output shaft of gear box 110. Motor 111, which is supported on the upper end of column 100, operates through the gear box 110 and chain drive 108 to rotate the sprocket 107 and thereby rotate or index the support member 104. As previously noted, 180° rotation of the support member 104 will move the upper reel 106 to the lower position where the laminate 76 will be attached to it and wound on that reel.

The lowermost of the two reels 106 is adapted to be rotated about its axis to thereby draw the film 2 through the apparatus and cause the laminate 76 to be wound in coiled form upon the reel. The drive mechanism for rotating the lower reel 106 includes a drive shaft 112 which is connected to a motor, not shown, and drive shaft 112 carries the sprocket 113 which is connected through a chain 114 to a sprocket 115 attached to a horizontal shaft 116. Shaft 116 is journalled within the fixed sleeve 102 and the opposite end of the shaft carries a small gear 117 which is engaged with two larger gears 118 and 119. Gears 118 and 119 are mounted for axial movement on the respective shafts 105, and the hub of each gear carries a jaw clutch member 120 which is adapted to be moved into and out of engagement with a complementary jaw clutch member 121 mounted on the side plate of the reel 106.

The jaw clutch members 120 and 121 are adapted to be automatically moved to the engaged position as the upper 106 is moved to the lower position, to thereby drive that reel and wind the laminate on the reel. To provide this action, each of the large gears 118 and 119 is provided with a hub 122, and the outer surface of each hub is formed with a peripheral groove 123. A pair of followers 124, which are located diametrically opposite each other, are disposed within the groove 123 of each hub, and the followers are attached to the outer ends of yoke 125 which are pivoted to the support member 104 at pivot 126. An adjustable screw 127 is threaded within a bracket 128 located on the opposite end of each arm, and the screws 127 are adapted to ride on cam surfaces 129 of cam member 130 as the support member 104 is rotated through 180°. As the support member 104 rotates, the gear 118 associated with the upper reel 106 will be moved axially outwardly toward the reel by the action of the screws 127 riding on the cam surface 129 to bring the jaw clutch members 120 and 121 into engagement so that when the reel has reached the lower position, the clutch members will be in full engagement to thereby drive the reel. As the reel 106 which was in the lower position is rotated upwardly, the cam mechanism will move the gear 119 axially in a direction toward the support 104 to thereby disengage the clutch members 120 and 121 so that when that reel reaches the upper position, the drive will be disengaged. Thus, the mechanism provides an automatic drive engagement for the reel as it is moved from the storage to the loading or winding position.

The adjusting screws 127 are urged into engagement with the cam surfaces 129 by springs 131 which are located within recesses 132 in the support member 104 and bear against the arms 125.

The kneading roll assembly 8 is best illustrated in FIGS. 12–15 and acts to provide a kneading action on the laminate 76 being wound on the reel 106 to provide thorough impregnation of the resin and chopped fibers. The kneading roll assembly 8 includes a pair of side plates 133 which extend upwardly from the sides of the base 99 and a pair of guide bars 134 are mounted on the inner surface of each side plate in spaced relation to each other to provide a guideway. Slide bars 135 of slide assembly 136 are adapted to slide within the guide bars 134. The slide assembly 136 also includes a cross member 137 which is connected between the slide bars, and a piston rod 138 of a pneumatic cylinder 139 is connected to the central portion of the cross member 137. The end of the cylinder 139 is pivotally connected through lugs 140 to the base 99. As the piston rod 138 is extended, the slide assembly 136 will be moved on the base 99 toward the take-up assembly 7. Conversely, when the piston rod is retracted, the slide assembly will be moved in a direction away from the take-up roll assembly 7.

Figure 12:
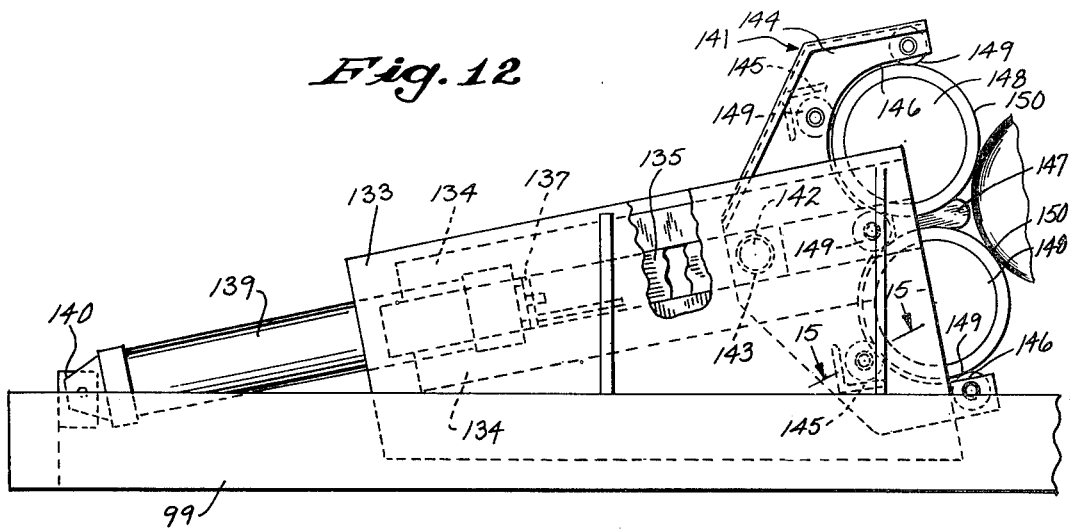
FIG. 12 is a side elevation of the kneading roll unit.
Figure 13:
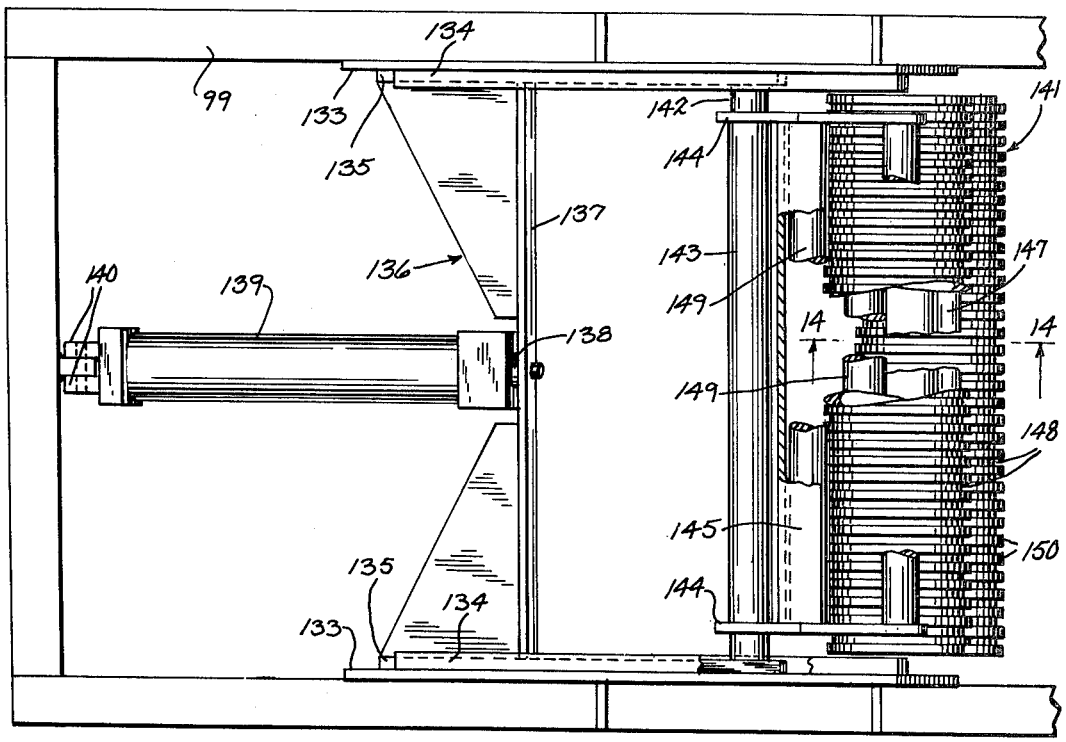
FIG. 13 is a top view, with parts broken away, of the kneading roll unit.
Figure 14:
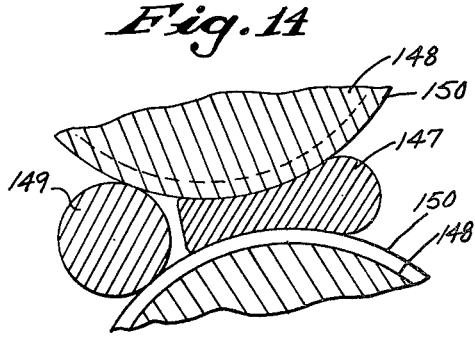
FIG. 14 is a section taken along line 14—14 of FIG. 13.

A kneading roll support unit 141 is pivotally attached to the forward end of the slide assembly 136. To provide the pivotal connection a shaft 142 extends between the ends of the slide bars 135, and a sleeve 143 is connected to the end plates 144 of support unit 141 and is journalled on the shaft 142. As best shown in FIG. 12, a pair of angles 145 extent transversely between the end plates 144. The forward edge of each end plate 144 is provided with a pair of partially circular pockets or recesses 146, and a spacer 147 is secured between the end plates 144 and is located between the pockets 146. As best illustrated in FIG. 14, the upper and lower surfaces of the spacer 147 are generally curved and conform generally to the curvature of the pockets 146.

Keading rolls 148 are adapted to be freely mounted within the pockets 146. Keading rolls 148 are not provided with shafts but instead are supported for rotation on a series of small rolls 149 which extend between the end plates 144. As the kneading rolls 148 do not have shafts which project laterally beyond the ends of the rolls, the rolls can fit snuggly between the the end flanges on the reel 106 on take-up assembly 7 which contains the wound laminate 76. Each of the kneading rolls 148 is provided with a series of circumferential ribs 150, and the ribs of one kneading roll are out of alignment with the ribs on the other kneading roll. As the kneading rolls ride against the surface of the coiled laminate 76, the ribs provide a pumping action to move the fibers and resin laterally within the laminate and provide a thorough impregnation of the resin and fibers. Locating the ribs 150 of each roll out of alignment increases the pumping effect, thus enabling the composite resin and fiber mixture to move laterally in a back-and-forth action as the kneading rolls ride on the wound laminate. The pumping action is continuous during the entire period that the laminate is being wound on the reel, but the intensity of the pumping action on any given convolution or turn of the coil will diminish as additional convolutions are wound on the coil.

Figure 15:
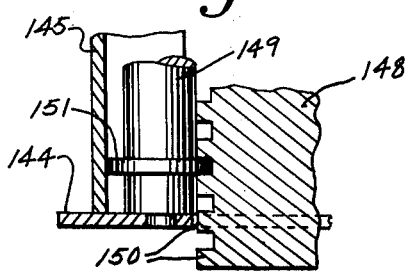
FIG. 15 is an enlarged fragmentary longitudinal section showing the aligning engagement of the guide roll with the kneading roll.

In order to maintain the kneading rolls in their proper lateral position, one of the guide rolls 149 associated with each kneading roll is provided with a circumferential ridge 151 which is adapted to ride in the groove between a pair of adjacent ribs 150 on the kneading roll, as shown in FIG. 15. Engagement of the ridge 151 with the groove between ribs 150 acts to maintain each kneading roll in its proper lateral position so that the ribs 150 of each kneading roll will be maintained in the desired non-aligned position.

The spacer 147 functions to prevent the kneading rolls 148 from falling out of the pockets 146 when the kneading rolls 148 are out of contact with the wound laminate 76. When the kneading rolls 148 havve been moved forwardly into engagement with the wound laminate on the lower reel 106, the kneading rolls fall back into contact with the supporting guide rolls 149 so that the kneading rolls do not contact the spacer 147.

In operation, after the laminate 76 is attached to the lowermost reel 106, air is introduced into the cylinder 139 to move the slide assembly 138 and the kneading roll support unit 141 forwardly to thereby bring the kneading rolls 138 into engagement with the laminate 76. As the laminate is wound on the kneading rolls, the ribs 151 on the rolls ride into the laminate and, as previously described, provide a pumping action which causes thorough impregnation of the resin and fibers.

The folded side edges 97 of the film 2 provide a dam to confine the fibers and resin during the kneading action and prevent the materials from being extruded from the side edges of the laminate. As the diameter of the wound laminate 76 on the reel 106 increases, the support unit 141 and slide assembly 136 will be moved rearwardly against the air pressure in cylinder 139. Thus, the cylinder 139 serves as a biasing means to constantly urge the kneading rolls into engagement with the laminate 76 being wound on the reel 106.

Figure 16:
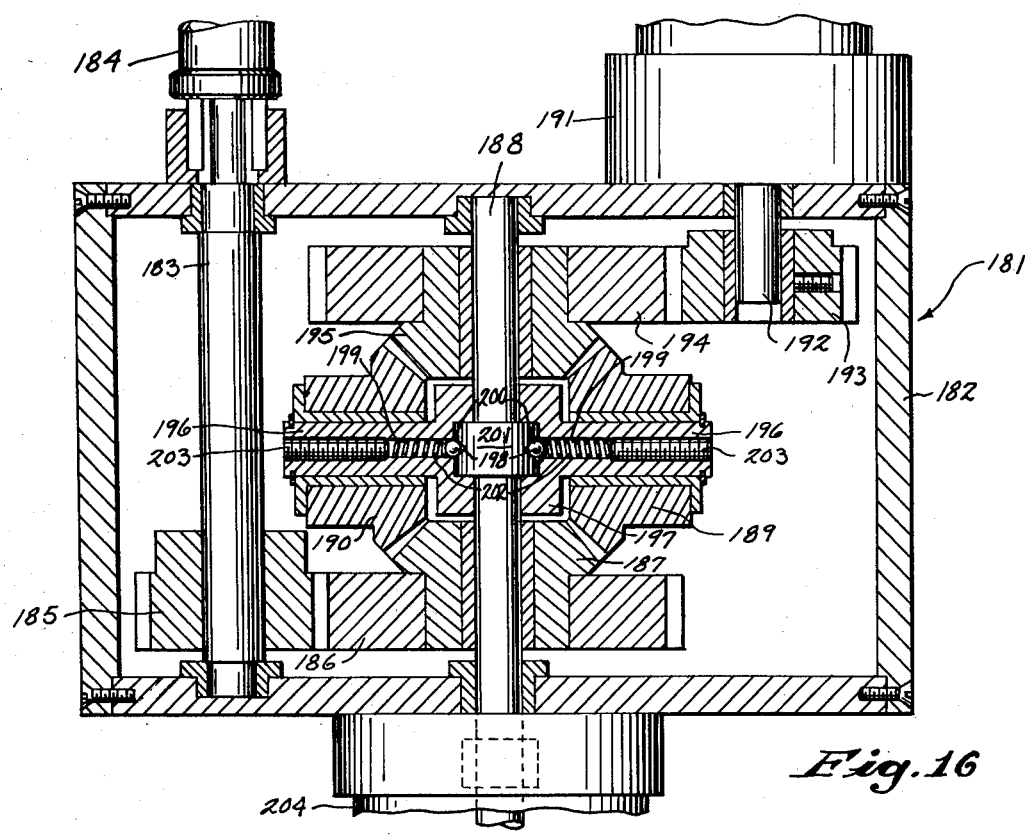
FIG. 16 is a sectional view of the valve block of the film tensioning unit.

The apparatus also includes a mechanism for maintaining uniform tension on the film 2 as it passes through the resin supply unit 4 and the fiber chopping unit 5. The tensioning mechanism is best illustrated in FIGS. 2 and 16 and includes a feeler 152 having a curved end 153 that rides on the upper surface from the film 2 as the film travels between the rollers 22 and 24. The inner end of the feeler 152 extends within an opening 154 in valve block 155 and is pivoted to the valve block by means of a pin 156.

The valve block 155 contains a valve control mechanism which regulates the amount of air being supplied to the pneumatic brake 21 in accordance with the tension of the film 2. Air is supplied to the valve block 155 through a line 157 that is threaded within an inlet 158, and the inlet 158 is connected to a passaage 159 of smaller diameter which in turn communicates with a cross passage 160. A needle valve 161 is located within the passage 160 and the position of the needle valve can be adjusted relative to the passage by means of the threaded connection of the end 162 of the needle valve with the enlarged threaded end of the passage 160. As shown in FIG. 16, the inner portion of the needle valve 161 is provided with a conical configuration as shown at 163 which terminates in a generally cylindrical tip 164. Conical portion 163 of the needle valve is adapted to register with the tapered end 165 of passage 160, while the tip 164 is is received within a recess 166. Threaded adjustment of the needle valve 161 within the passage 160 will vary the clearance between the conical portion 163 and the tapered passage 165 to thereby regulate the amount of air passing through the passage 160.

Passage 167 communicates with the passage 160 and an outlet line or tube 168 is threaded in the enlarged end 169 of passage 167. Line 168 is connected to the brake 21 which is associated with the drum 3 that contains the coiled film 2. The opposite end of the passage 167 communicates with the tapered end 170 of a passage or bore 171 that intersects the opening 154 in the valve block 155. A second needle valve 172 is located within the passage 171 and is provided with a generally conical end portion 173 that registers with the tapered passage 170. Needle valve 172 is also provided with an elongated tip 174 that extends within the passage 175. The outer end of passage 175 communicates with an enlarged threaded bore 176, and a set screw 177 is threaded within the bore 176 and serves as a stop to limit the movement of the needle valve 172 within the passage 170. A bleed-off passage 178 communicates between the passage 170 and the exterior and serves as a route for bleeding off air which passes through the needle valve 172.

The end of the needle valve 172 is secured to the feeler 152, and the needle valve and the attached feeler are urged downwardly by a coil spring 179 which is located within the bore 171. The force of the spring 179 can be varied by means of a set screw 180 which is threaded within the outer end portion of bore 171.

If the film 2 passing between the rollers 22 and 24 slackens, the force of the spring 179, in combination with the weight of the needle valve 172, will urge the feeler 152 downwardly against the slackened film, thereby tending to close the needle valve 172 and decrease the amount of air flowing from the passages 167, 170 and 178 to the atmosphere and correspondingly increase the proportion of air flowing to the brake 21 through the outlet 168. Increasing the braking action will result in the film 2 becoming more taut and this will pivot the feeler 152 upwardly, thereby opening the needle valve 172 and permitting a greater proportion of air to bleed to the exterior through passage 178. Bleeding a greater proportion of air to the atmosphere will reduce the proportion of air being supplied to the brake 21 to thereby decrease the braking action.

Thus, the apparatus includes a system which senses the tension on the film 2 and automatically operates the braking mechanism associated with the drum 3 to maintain a substantially uniform tension on the film at all times.

As previously noted, the film 2 is drawn through the apparatus by virtue of rotation of the take-up reel 106. As the diameter of the wound laminate 76 is increased on the take-up reel, the speed of travel of the film would normally be correspondingly varied. Accordingly, the apparatus includes a mechanism for providing a constant film speed regardless of the diameter of the wound laminated structure 76 on the take-up reel 106. Uniform speed is achieved through use of a differential mechanism indicated generally by 181, and shown in FIG. 17. The differential 181 includes a casing 182 and a first input shaft 183 is mounted for rotation within the walls of the casing and is connected to a flexible shaft 184. The other end of the flexible shaft is connected to the shaft 25 of roll 24. Roll 24 is freely rotatable and rotation of the roll 24 conforms to the speed of the film 2 passing thereover, and the speed of the film 2 is transmitted through the flexible shaft to the input shaft 183.

Shaft 183 carries a gear 185 which drives a larger gear 186 attached to bevel gear 187. Bevel gear 187 is journalled on the output shaft 188 and acts to drive the pair of beveled gears 189 and 190. A reference motor 191, which is preset for the desired speed, provides a second input to the differential. The output shaft 192 of motor 191 carries a gear 193 which drives a larger gear 194 attached to bevel gear 195. Bevel gear 195 is also journalled on the output shaft 188 and drives the beveled gears 189 and 190.

The bevel gears 189 and 190 are mounted for rotation about the outwardly extending cylindrical arms 196 of a spider 197.

A connection is provided between the spider 197 and the output shaft 188 by means of a pair of balls 198, each of which is mounted within the inner end of a bore 199 in the arm 196 of the spider 197. The balls 198 are received within detents 200 formed in the outer surface of a collar 201 attached to the shaft 188. Balls 198 are urged into engagement with the detents 200 by means of springs 202 which are located in the bores and are interposed between the balls and the inner ends of the set screws 203 which are threaded within the bores.

Figure 17:
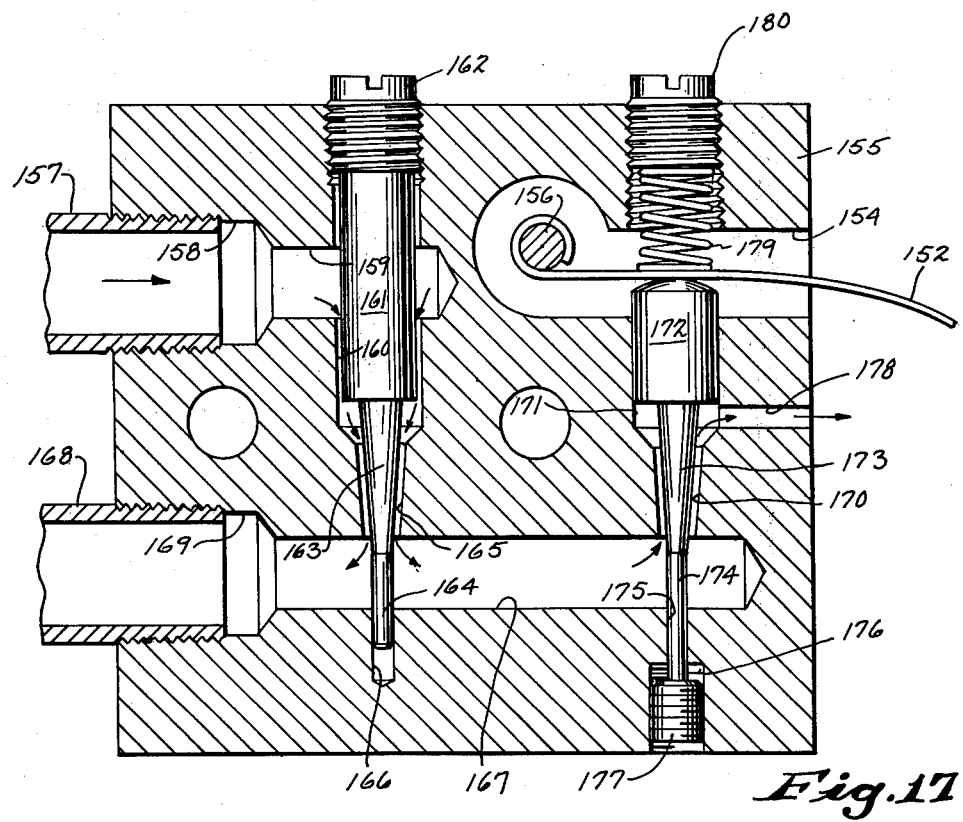
FIG. 17 is a sectional view of the differential used to control the take-up roll drive.

The output shaft 188 is operably connected to the adjustment shaft 204 of a standard reciprocating, sheave type, variable speed drive 205, the output of which is connected to shaft 112, which, in turn, serves to drive the take-up reel 106. Thus, the differential mechanism illustrated in FIG. 17 provides a means for maintaining a substantially constant film speed even though the diameter of the wound laminate 76 on the take-up spool 106 is progressively increased during the operation.

In operation, the reels 106 are slid onto the shafts 105 of the take-up assembly 7 and locked in position by any conventional latching mechanism. The film 2 is then uncoiled from the drum 3 and fed through the apparatus and attached to the reel 106 which is in the lower position. With the film attached, the motor 191 is operated to rotate the reel 106 and draw the film 2 through the apparatus, and simultaneously, the motor 61 is operated to drive the roller 33 of the resin supply unit 4 to thereby deposit a coating 46 of resin on the film 2. The glass chopping unit 5 is also operated to chop the fibers and deposit a layer 75 of fibers on the resin coating to provide the laminate 76.

As the laminate 76 passes through the edge folding mechanism 6, the projecting side edges of the film 2 are folded over in a double fold, as shown in FIG. 8, and the laminate is then wound on the take-up reel 106.

To provide the kneading action, the cylinder 139 is actuated to thereby force the kneading rolls 148 into engagement with the laminate 76 being wound on the take-up reel 106 and effects a pumping action on the wound laminate to thoroughly impregnate the fibers and resin.

When the reel 106 has been fully wound with the laminate 76, the resin supply unit 4 and glass chopping unit 5 are turned off for a brief period to allow a few wraps of clear film 2 over the completed roll of laminate. The cylinder 139 is then operated to retract the kneading reels 148 and motor 111 is operated to thereby rotate the support 104 and move the upper reel downwardly into the lower position. As previously described, as the upper reel approaches the horizontal position, the clutch members 120 and 121 will be engaged to thereby rotate the reel about its axis. The clear film 2 is then severed in the area between the two take-up reels 106 and the severed end of the film is then attached to the empty reel which is then in the lower position. With the film attached to the empty or lower reel, the resin supply unit 4 and glass chopping unit 5 are restarted to form the laminate 76 and the cylinder 139 is actuated to move the kneading rolls 148 into engagement with the laminate 76 being wound on the lower reel 106 and the operation is continued.

The apparatus provides a continuous process for forming a sheet molding compound which utilizes only a single sheet of plastic film. The combination of the edge-turning mechanism 6, which folds the edge of the film over the resin and fiber materials, along with the kneading rolls 148, produces a thorough impregnation of the fibers and resin even in the areas adjacent the side edges of the laminate.

The mechanism includes an automatic speed control which maintains the speed of travel of the film at a constant rate as well as an automatic tensioning device for maintaining proper tension on the film at all times. These mechanisms aid in providing a more uniform product in which substantially the same amounts of fibers and resin are deposited in all areas of the moving film.

Various modes of carrying out the invention are contemplated as being within the scope of the following claims particularly pointing out and distinctly claiming the subject matter which is regarded as the invention.

I claim:

1. An apparatus for forming a composite structure, comprising means for moving a film of sheet material in a given path, resin supply means for depositing a coating of resin on the film as it moves in said path, fiber supply means for depositing a layer of fibers on the resin coating to provide a composite structure, said coating of resin and said layer of fibers being spaced from a side edge of said film, folding means for folding said side edge of the film partially over the coating of resin and the layer of fibers in a first fold, means for winding the composite structure in coiled form to provide a wound coil, and pressure means for applying pressure to the wound coil at a series of first locations spaced along the length of the wound coil to thoroughly impregnate the fibers and the resin.

2. The apparatus of claim 1, wherein said pressure means comprises a roll having a series of circumferentially extending ribs disposed to engage the wound coil.

3. The apparatus of claim 2, and including a second roll spaced circumferentially from the first roll and having a series of second circumferentially extending ribs disposed to engage the wound coil.

4. The apparatus of claim 3, wherein the ribs of the first roll are disposed out of alignment with the ribs of the second roll, whereby the engagement of the wound coil by said first and second ribs provides a pumping action within the composite structure to move the resin and fibers in a direction toward and away from the side edges.

5. The apparatus of claim 3, and including biasing means for urging said first and second rolls into engagement with the wound coil.

6. The apparatus of claim 2, and including aligning means to prevent axial movement of said roll, said aligning means comprising a projection adapted to ride within a groove between adjacent ribs of said roll.

7. The apparatus of claim 2, wherein said pressure means also includes a pair of laterally spaced support members, said support members having a generally curved recess to receive said roll, and a plurality of rotatable members extending between said support members to rotatably support said roll.

8. The apparatus of claim 7, wherein each support member is provided with a second generally curved recess, and said pressure means includes a second roll having circumferentially extending ribs disposed to engage the wound coil, said second roll being rotatably mounted within said second recess.

9. The apparatus of claim 8, and including a spacing member extending between the support members and located between said rolls to space the rolls apart.

10. The apparatus of claim 9, wherein the surfaces of said spacing member facing the respective rolls are curved to complement the surfaces of the rolls.

11. The apparatus of claim 7, and including a circumferentially disposed rib on one of said rotatable members and disposed within a groove between adjacent ribs of said roll to thereby prevent axial displacement of said roll.

12. The apparatus of claim 5, wherein said pressure means includes a frame and a movable section mounted for sliding movement on the frame in a direction toward and away from said wound coil, said first and second rolls being rotatably mounted on said sliding section, said biasing means comprising a fluid cylinder operably connected to said sliding section for urging the rolls into engagement with the wound coil.

13. An apparatus for fabricating a laminated composite structure, comprising means for moving a film of sheet material in a given path of travel, resin supply means for depositing a coating of resin on the film as it moves in said path, fiber supply means for depositing a layer of fibers on the resin coating to provide a composite structure, said coating of resin and layer of fibers being spaced from the side edges of said film, first folding means for folding said side edge of the film partially over the coating of resin and layer of fibers to provide a fold extending along each side of the composite structure, a wind-up reel, means for winding the composite structure on the reel to provide a wound coil, and pressure means engaged with the wound coil for applying pressure to said wound coil and impregnating said resin into said layer of fibers.

14. The apparatus of claim 13, and including second folding means disposed downstream in said path of travel from said first folding means for folding said side edge of the film in a reverse second fold and provide a generally S-shaped configuration for said side edge.

15. The apparatus of claim 13, wherein said first folding means comprises a rotatable disc and said side edge of the film is folded over the peripheral edge of said disc.

16. The apparatus of claim 15, wherein said disc is disposed at an acute angle with respect to the path of travel of the composite structure, and said first folding means includes a roller located in spaced relation to the peripheral edge portion of the disc, said edge portion of the film disposed between the periphery of the disc and said roller.

17. The apparatus of claim 15, wherein said first folding means comprises a rotatable disc and said side edge of the film is folded over the peripheral edge of said disc and said second folding means comprises a finger following said disc in the direction of travel of said composite structure, the side edge of the film disposed to be folded over said finger to provide said second fold.

18. The apparatus of claim 16, and including biasing means operably connected with the roller to urge the roller toward the peripheral edge portion of the disc.

19. In an apparatus for forming a composite structure, a rotatable drum to contain a film of sheet material, means for drawing the film from the drum and passing the film in a given path of travel, resin supply means for depositing a coating of resin on the film as it moves in said path, fiber supply means for depositing a layer of fibers on the resin coating to provide a composite structure, means for winding the composite structure in coiled form to provide a wound coil, brake means associated with the drum, sensing means disposed to sense the tension of said film as it moves in said path of travel, and means responsive to said sensing means for varying the braking force on said drum to thereby maintain a uniform tension on said film as it moves in said path of travel.

20. The apparatus of claim 19, wherein said brake means is fluid operated, and said means for varying the braking force comprises first conduit means connected to a source of fluid under pressure, second conduit means connected to said brake means, discharge conduit means exposed to the atmosphere, valve means interconnecting said first conduit means, said second conduit means and said discharge conduit means, said sensing means including a feeler disposed in contact with said film, said feeler being movable in a first direction as the film becomes slack and being movable in the second direction as the film becomes taut, means responsive to movement of said feeler in the first direction to operate the valve means and increase the proportion of fluid being supplied to the brake means to thereby increase the braking force, and means responsive to movement of the feeler in the second direction to operate the valve means and increase the proportion of fluid being discharged through said discharge conduit means to the atmosphere and correspondingly decrease the proportion of fluid supplied to said brake means to thereby decrease the braking force.

21. The apparatus of claim 20, wherein said feeler is pivotally mounted about an axis disposed generally parallel to the path of travel of said film.

22. In an apparatus for making a composite structure, means for moving a film of sheet material in a given path of travel, resin supply means for depositing a coating of resin on the film as it moves in said path of travel, fiber supply means for depositing a layer of fibers on the resin coating to provide a composite structure, means for winding the composite structure in coiled form on a reel to provide a wound coil, drive means for rotating the reel to thereby draw the film through said path of travel and wind the composite structure on said reel, and means for varying the speed of said drive means in proportion to the diameter of the wound coil on the reel to thereby maintain a substantially uniform speed of travel of said film through said path of travel, said last named means includes a differential having a pair of inputs and an output connected to said drive means, an indexing motor operably connected to one of said inputs, and means responsive to the speed of travel of said film and operably connected to said second input.

23. The apparatus of claim 22, wherein said means responsive to the speed of travel of the film comprises a rotatable roll to support the film, and means to transmit rotation of said roll to said second input.

* * * * *

UNITED STATES PATENT AND TRADEMARK OFFICE
CERTIFICATE OF CORRECTION

PATENT NO. : 3,969,178
DATED : July 13, 1976
INVENTOR(S) : RICHARD L. JEANSON

It is certified that error appears in the above—identified patent and that said Letters Patent are hereby corrected as shown below:

Column 1, line 19, Cancel "position" and substitute therefor ---operation---, Column 2, line 11, Cancel "tap" and substitute therefor ---tab---, Column 8, line 52, Cancel "havve" and substitute therefor ---have---, Column 9, line 23, Cancel "passaage" and substitute therefor ---passage---

Signed and Sealed this

Twelfth Day of October 1976

[SEAL]

Attest:

RUTH C. MASON
*Attesting Officer*

C. MARSHALL DANN
*Commissioner of Patents and Trademarks*